Feb. 6, 1973  K. W. POPE  3,715,417
METHOD OF FABRICATING A BUILDING PANEL CONTAINING
CELLULAR POLYURETHANE
Filed Aug. 31, 1967  3 Sheets-Sheet 2
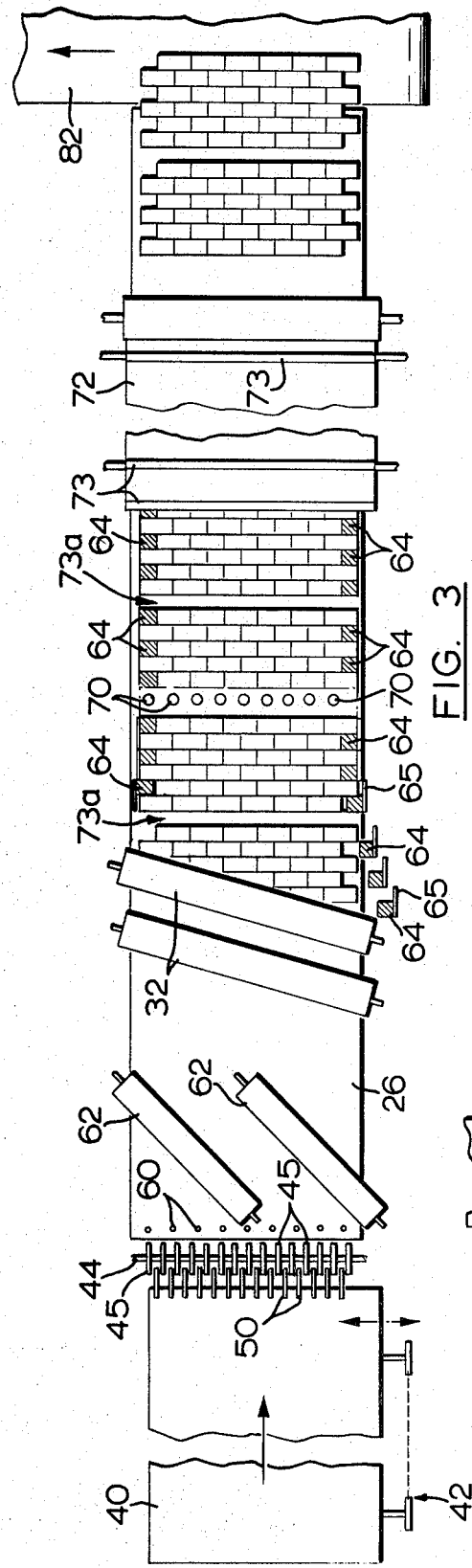
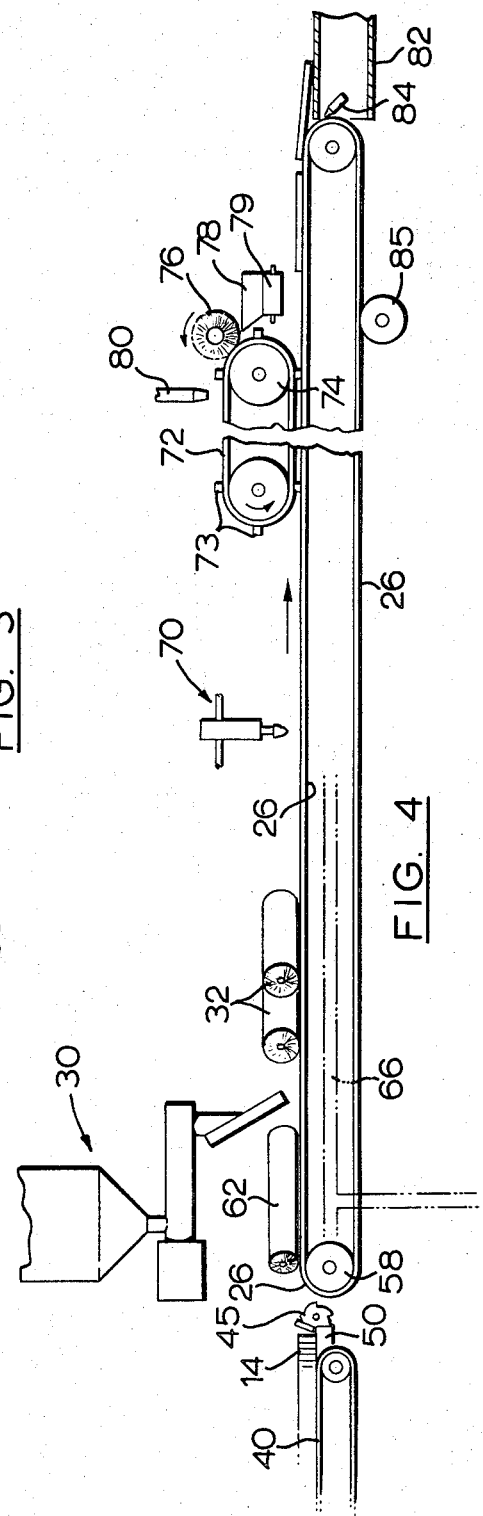
INVENTOR.
KENNETH W. POPE
BY
Attorney

United States Patent Office 3,715,417
Patented Feb. 6, 1973

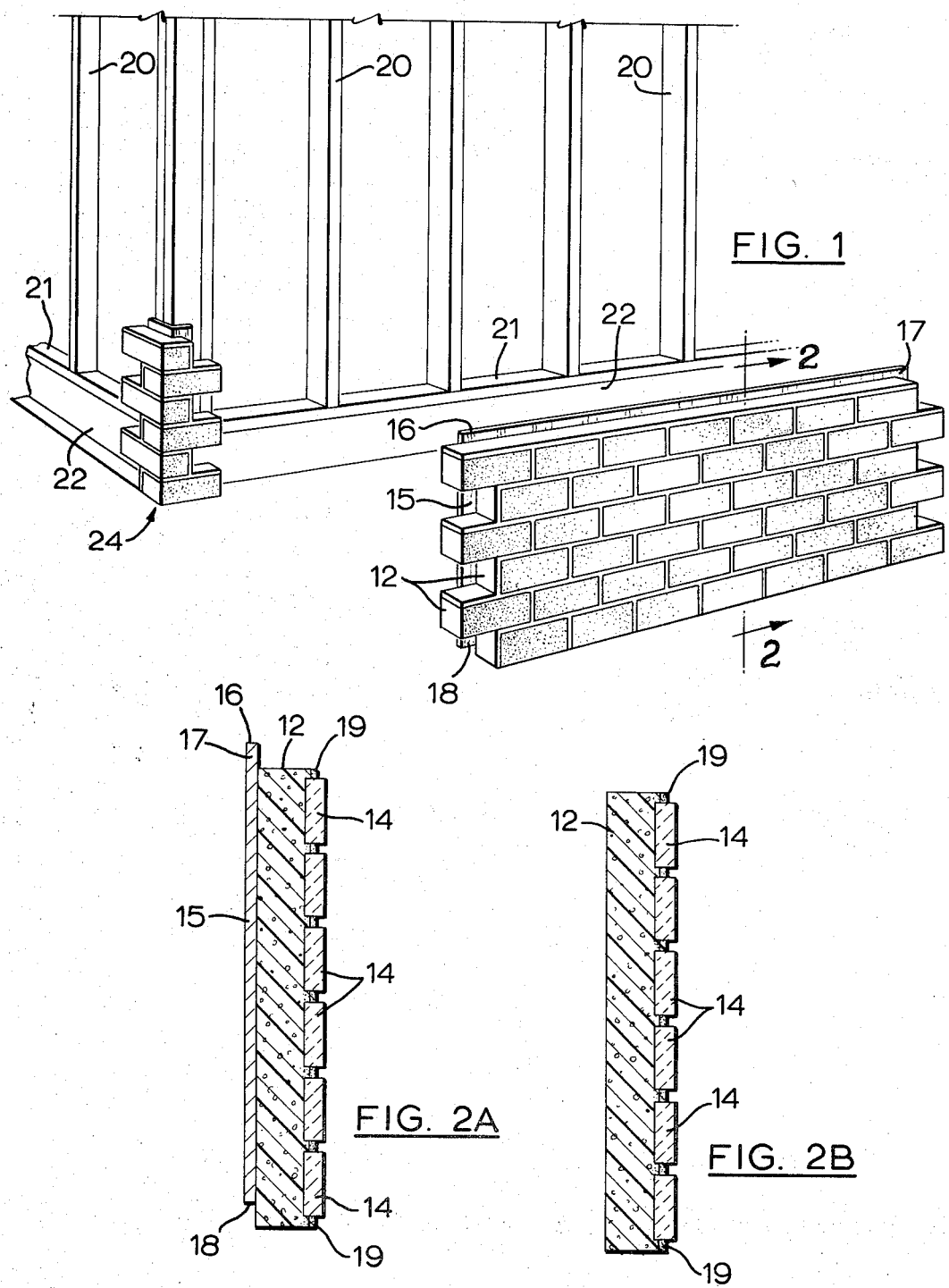

3,715,417
METHOD OF FABRICATING A BUILDING PANEL CONTAINING CELLULAR POLYURETHANE
Kenneth W. Pope, Kitchener, Ontario, Canada, assignor to Du Pont of Canada Limited, Montreal, Quebec, Canada
Filed Aug. 31, 1967, Ser. No. 664,752
Claims priority, application Great Britain, Sept. 2, 1966, 39,434/66
Int. Cl. B29d 27/00
U.S. Cl. 264—45
7 Claims

ABSTRACT OF THE DISCLOSURE

A prefabricated building panel having a layer of cellular plastic such as polyurethane foam, to one face of which are bonded brick-like facing elements spaced from one another. A granular material, such as sand, is adhered to and embedded in the cellular plastic between the facing elements to give the appearance of mortar between the facing elements.

---

This invention relates to building panels, and to methods and apparatus for the manufacture of building panels. More specifically, the invention is concerned with a prefabricated building panel having a layer of rigid foamed plastic, preferably polyurethane, to one face of which are bonded facing elements such as brick, stone, ceramic, wood, concrete or plastic tile. The building panel includes granular or particulate material, for example sand, also bonded to the polyurethane foam in the spaces between the facing elements to give the appearance of mortar.

Prefabricated building panels including a rigid foamed urethane polymer core and facing materials are known and have been utilized in the construction of buildings. Canadian Pat. 624,099, issued July 18, 1961 to C. H. Sissons, describes one such building panel comprising a foamed plastic core with continuous facing and backing sheets on both sides of the core. The method disclosed for making the panel includes the steps of placing the backing and facing sheets in a vertical form, and then foaming the plastic core between the sheets. U.S. Pat. 3,131,514, issued May 5, 1964 to M. Siek, discloses a similar prefabricated panel having a core formed from a thermosetting resin and plate-like facing elements embedded in the resin on at least one side of the panel. The space between the facing elements includes a synthetic fire resistant material bonded to the core and to the elements.

According to one aspect of this invention, the present invention provides a prefabricated building panel comprising a rigid layer of cellular plastic, spaced facing elements bonded to one face of said layer, and granular material adhered to and embedded in the cellular plastic between the facing elements. The granular material can, for example, be sand, and this gives to the cellular plastic between the facing elements the appearance of mortar. Preferably the plastic is polyurethane. According to another aspect of this invention, the building panel has a rigid backing sheet adhered to the face opposite the face to which the facing elements are bonded. By using facing elements resembling conventional bricks, the building panel can be given the appearance of a conventional brick wall with mortar between adjacent bricks.

The finished panels can be fastened directly to the building framework or building siding by means of an adhesive, fasteners, or a combination of both. The foamed polyurethane core is light in weight, rigid, and provides excellent insulating properties. The facing elements, together with the granular material in the spaces, provide at once both an attractive and decorative covering against the effects of weather.

Two embodiments of this invention are shown in the accompanying drawings, in which like numerals denote like parts throughout the several views, and in which:

FIG. 1 is a perspective view of a building construction showing the panel of the invention and its use;

FIGS. 2A and 2B are cross-sectional views of two embodiments of the invention, taken at the lines 2—2 of FIG. 1;

FIG. 3 is a plan view of apparatus for producing a building panel according to this invention;

FIG. 4 is an elevational view of the apparatus of FIG. 3;

Figure 5:
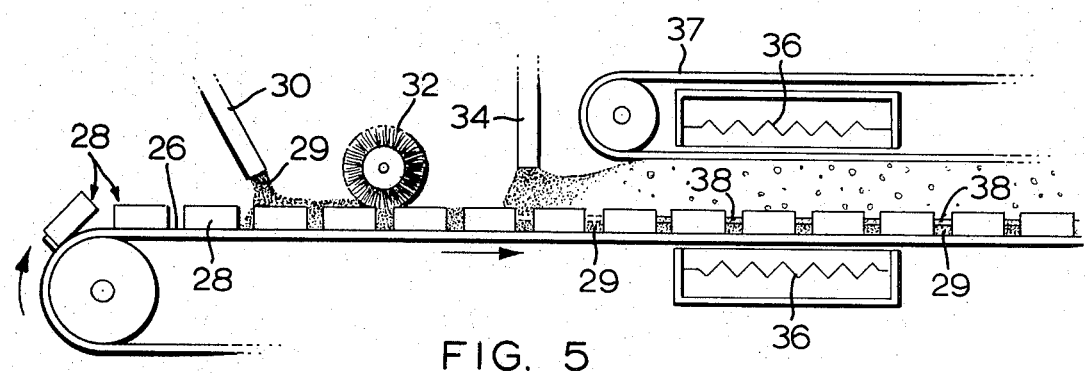
FIG. 5 is an elevational schematic view of the essential components in the apparatus shown in FIGS. 3 and 4.

In the embodiment illustrated in FIGS. 1 and 2A, a panel 10 consists of a rigid layer 12 of cellular plastic, to one face of which are bonded a plurality of brick facing elements 14 which have the same dimensions as conventional bricks in the vertical plane, but which are only about ½ inch to 1 inch deep. The brick facing elements 14 are partially embedded in the rigid layer 12, and the latter is approximately 1½ to 3 inches thick, depending upon the insulating value required. The preferred plastic material is polyurethane foam, although any other plastic material with like rigidity and insulating properties in the cellular or foamed condition could be employed. In the remainder of this specification the plastic will be referred to as polyurethane foam. The brick facing elements 14 are spaced to give the appearance of a normal brick and mortar wall, and a suitable granular material, preferably sand, is adhered to and embedded in the polyurethane foam layer 12 in the spaces between the brick elements 14, providing an authentic mortar-like appearance. Each panel can be approximately 1 to 2 feet by about 3-6 feet in size, for convenient handling. Naturally, any size could be used.

Although the facing elements 14 preferably are clay brick or stone, a different exterior appearance may be achieved by utilizing facing elements of ceramic, glass, cement or plastic tile, or any other similar material that can be bonded to the polyurethane foam layer 12 in the same manner as herein described.

Sand is the preferred granular material for inclusion between the facing elements, since it is a major component of conventional mortar and thus provides an exterior appearance virtually indistinguishable from actual mortar. Sands of different colours (natural or artificial) can be utilized for the simulated mortar joint, depending upon the visual effect desired. In addition, ground stone, minerals, ceramics, or pulverized brick or glass also can be utilized to obtain a different appearance. It is important that the sand and/or other granular material be of relatively fine mesh so that it will penetrate the surface of the polyurethane between the facing elements as it is being foamed, and produce a dense, hard "skin." The granular material should consist of a minimum of 80% fines able to pass through a number 8 screen, and a maximum of 20% fines able to pass through a number 40 mesh screen. The granular material should be an inorganic substance which will not react with the polyurethane as it is being foamed and which is relatively unaffected by exposure to weather. For example, the particulate material should be insoluble in water so that it will not be washed away by rain, and it should not contain any deleterious contaminants, such as iron which will rust and produce discolouration. Substances which will absorb water or which are subject to excessive expansion and contraction in varying temperatures should be avoided.

The outer surface portion or "skin" or the polyurethane foam in which the sand or other granular material is embedded is shown in FIGS. 2A and 2B as a layer 19.

The embodiment shown in FIGS. 1 and 2A also has a rigid backing sheet 15, preferably of plywood, which is secured to the polyurethane foam. Preferably the backing sheet 15 is bonded directly to the polyurethane foam, without the use of an adhesive, although the use of an adhesive for this purpose is considered within the scope of this invention. The upper edge 16 of the sheet 15 projects above the polyurethane foam to provide a flange 17 of rigid material through which the panel 10 can be nailed to suitable supporting structure. The lower edge 18 lies above the lower edge of the polyurethane foam in order to accommodate the edge 16 of the panel next below it. As FIG. 1 shows, the rows of brick facing elements 14 in the panel 10 are staggered such that, at the side edges of the panel 10, alternate rows have projecting bricks, which extend beyond the adjacent bricks a distance equal to one-half their length. The sides edges of the rigid backing sheet 15 are positioned mid-way between the side edges of the projecting and the recessed brick facing elements, as shown. In this way, when adjacent panels 10 are fitted into place, the corresponding edges (sides, top and bottom) on the backing sheets 15 abut.

Turning again to FIG. 1, part of a building framework is shown to include upright studs 20, horizontal members 21 on which the studs 20 rest, and horizontal trimmers 22 supporting the members 20. The panel 10 shown in FIG. 1 is adapted to span four studs 20, and the backing sheet 15 is preferably glued to all contacting studs 20 and members 21 and 22. Naturally, there could be more or less studs spanned by the panel 10. The panel is also adapted to be nailed directly through the flange 17 to the studs 20 and toe-nailed from the back through the studs 20.

Corner brick-work 24 can be provided to fit complementally with panels 10 stretching along the walls adjacent the corner. Preferably the corner brick-work 24 is specially molded in polyurethane foam having brick facing elements identical to those used in the panels 10.

The second embodiment of this invention is shown in FIG. 2B, and is identical to that shown in FIG. 2A, except that the backing sheet is omitted. It is conceivable that it may be desirable to produce and use the panel in the form of this second embodiment, for example when the panel is to be used as an interior decorative and insulative wall covering, as an exterior covering for concrete block walls, or as a liner for a poured cement wall.

The production of polyurethane foams is very well known in view of their wide-spread use in recent years for similar purposes and will not be discussed in extensive detail herein. The polyurethane foam preferably is prepared from an isocyanate and a polyether resin. Polyester resins can be substituted for the polyether resin, but the latter have proven superior and are usually preferred for most applications. A blowing agent is incorporated into the resin during its formation to foam the urethane polymer into a cellular structure. A catalyst and a stabilizer for the reaction are usually included as well. The function of the stabilizer is to promote uniform cell distribution and cell size. A preferred stabilizer is an organic polysiloxane, or a product combining an organic polysiloxane with a surface-active compound such as that available from Dow-Corning (Dow-Corning DC 193). There are many well known catalysts for the reaction between the isocyanate and the resin, including for example, stannous octoate, dibutyltin dilaurate, triethylene diamine, tetramethyl butane diamine, and dimethyl ethanolamine.

The gas which is included in the reaction as the blowing agent can be trichloromonofluoromethane (commonly known under the registered trademark Freon) or methylene chloride. Blowing of the urethane polymer also can be obtained through the use of water which reacts with the isocyanate to produce carbon dioxide. However, carbon dioxide tends to permeate out of the cells and does not contribute to the polyurethane foam insulating proptries as well as Freon or methylene chloride.

The isocyanate can be, for example, an aromatic di-isocyanate or what is referred to as a "polymeric isocyanate." Typical and widely utilized isocyanates are toluene di-isocyanate and 4,4-diphenylmethane di-isocyanate. The latter is available under the trademark "Mondur MR" from Mobay Chemical Co. as a 92% to 93% composition with 7% to 8% "impurities" consisting of other functional materials having additional reactive sites.

Several types of polyether resins are available for the preparation of rigid urethane foams, for example, poly (oxypropylene) ethers of glycerol, trimethylolpropane, 1,2,6-hexanetriol, and sorbitol. In addition, poly (oxypropylene)-poly (oxyethylene) block copolymers can be utilized. The polyether resin also can be a nitrogen-containing material such as a poly (oxypropylene)-poly (oxyethylene block copolymer with ethylenediamine. An example of polyether resins conventionally utilized are aminespined resins such as those available from Wyandotte Chemical Corporation under the trademark Quadrol or from Union Carbide under the designation LA-700. Preferably, however, a phosphorus-containing polyglycol specifically prepared for polyurethane foam formulations and possessing a degree of fire resistance is utilized. Such a starting resin can be obtained from Dow Chemical Co. under the designation RF-380.

The rigid polyurethane foam can be made by bringing all of the reactants together at the same moment for foaming, commonly referred to as a "one-shot" reaction. It is possible, however, to partially react the isocyanate with some or all of the resin to form a resin prepolymer prior to the actual step of foaming.

The following formulations for the production of rigid polyurethane foam are included by way of an example, and are not to be construed as limiting the invention.

EXAMPLE I

Parts by weight

| | |
|---|---|
| 4,4-diphenylmethane di-isocyanate (Mondur MR—Mobay Chemical Co.) | 109 |
| Polyoxypropylene glycol—molecular weight≈440 (NIAX Triol LK 380—Union Carbide) | 85 |
| Polyoxypropylene glycol—molecular weight≈400 (NIAX Pentol LA 700—Union Carbide) | 15 |
| Trichloromonofluoromethane (Freon II—Dupont) | 40 |
| Catalyst—N,N-dimethyl piperazine (Mobay C-16) | 1.1 |
| Polysiloxane stabilizer (Union Carbide L-530) | 1.0 |

EXAMPLE II

Parts by weight

| | |
|---|---|
| Polyoxypropylene glycol (Octol 52-460—Allied Chemical) | 100 |
| Toluene di-isocyanate (Crude form—Naconate 4040—Allied Chemical) | 94 |
| Trichloromonofluoromethane (Freon II—Dupont) | 35 |
| N,N-dimethyl ethanolamine | 1.0 |
| Dibutyltin dilaurate | 0.4 |
| Polysiloxane stabilizer (Dow-Corning DC-113) | 1.5 |

EXAMPLES III

Parts by weight

| | |
|---|---|
| Polyoxypropylene glycol—molecular wt.≈440 (RF-380—Dow Chemical) | 100 |
| 4,4-diphenylmethane Di-isocyanate (Mondur MR—Mobay) | 100 |
| Trichloromonofluoromethane (Freon II—Dupont) | 40 |
| N,N,N,N-tetramethyl butanediamine | 2.0 |
| Polysiloxane stabilizer (Dow-Corning DC-113) | 2.0 |

According to the present invention the building panel can be manufactured on a batch basis, or preferably by utilizing apparatus for continuous production. The steps in the method of manufacturing are basically the same whether the production is carried out one at a time or on a continuous basis.

If the panels are to be made one at a time, the relatively thin facing elements (for example brick) are placed face-down in the desired relation on the bottom of a mold having the desired external shape. The bottom of the mold conveniently can be provided with locating bars to space the facing elements into the desired pattern. The granular material, preferably sand, then is placed in the spaces between the facing elements to a depth approximately even with the backs of the facing elements. The urethane foam ingredients then are brought together for the foaming reaction and the mixture is spread over the back of the facing elements. This can be accomplished by using, for example, a conventional twin-component urethane gun, such as that available from Binks Manufacturing Co. of Chicago, U.S.A. The mold is then either covered with a plywood backing sheet, or left uncovered, depending on the embodiment being manufactured. The reactants are permitted about 5 to 10 minutes to complete the foaming reaction, during which they fill the mold cavity, and cure to a rigid urethane foam. The completed panel then is removed from the mold, trimmed, and inspected. The excess sand or other particulate material is brushed from the spaces between the facing elements, and the panels are ready for storage or shipment to the building site.

The sand is impregnated into the urethane between the facing elements to a depth of about ⅛ to ¼ inch, creating a very hard surface having a sand cover. The presence of the sand alters the cellular structure of the urethane at the surface making it hard and dense, and highly resistant to puncture and distortion.

Attention is now directed to FIGS. 3, 4 and 5. FIG. 5 is a schematic representation of the different sequential operations in the formation of building panels, taking place along a continuous conveyor 26, and resulting in sequentially produced finished panels. The conveyor 26 is moving from left to right in FIG. 5 (as it is also in FIGS. 3 and 4) and sequential rows 28 of brick facing elements 14 are positioned in spaced and staggered relationship on the conveyor 26 by a feeding means shortly to be described in detail with reference to FIGS. 3 and 4. Sand or other granular material 29 is distributed over the tops or backs of the brick facing elements 14 by a dispenser 30 which dispenses the sand as evenly as possible across the width of the conveyor 26. A rotary roller brush 32 rotates clockwise as seen in FIG. 5, and the ends of its bristles touch the backs or tops of the brick facing elements 14, such that the sand or other granular material 29 is cleared from the tops or backs of the facing elements 14 but remains in the spaces between adjacent facing elements 14. To the right of the roll brush 32 is mounted a row of two-component urethane guns 34, which distribute the urethane 35 evenly over the rows of facing elements 14. The conveyor 26 then carries the panel components into a curing oven 36 in which the urethane 35 is heated, to facilitate curing and forming. Just prior to entry into the curing oven 36, a second conveyor 37 contacts the top of the urethane 35 and exerts downward pressure on it such that, during passage of the urethane 35 through the curing oven 36, the lower layer of cells of the urethane 35 are broken by the sand 29, and the layer 38 in which non-cellular urethane is mixed with sand gradually thickens to its final depth, which of course remains unchanged after the curing has taken place.

Turning now to FIGS. 3 and 4, the apparatus provided by this invention for continuously producing prefabricated building panels of the above type will now be described. For the purpose of this description, it has been assumed that the facing elements are clay brick, but it is to be understood that any other bondable material can be substituted. At the left in FIGS. 3 and 4 is shown a feed conveyor 40. The brick facing elements 14 are placed on the feed conveyor standing on their long side with their "outside" face to the left. The conveyor 40 moves the brick facing elements to the right in the direction of the arrow toward the main conveyor 26. The feed conveyor 40 is of the traversing type which reciprocates laterally during the operation to stagger the rows of brick. The lateral reciprocation mechanism is shown schematically at 42 in FIG. 3. It is not considered necessary to show this mechanism in detail, as it is familiar to those versed in this field. The feed conveyor 40 brings the brick facing elements 14 to a rotating shaft 44 to which are secured a plurality of cams 45 for loading the brick facing elements 14 on the main belt 26.

Figure 6:
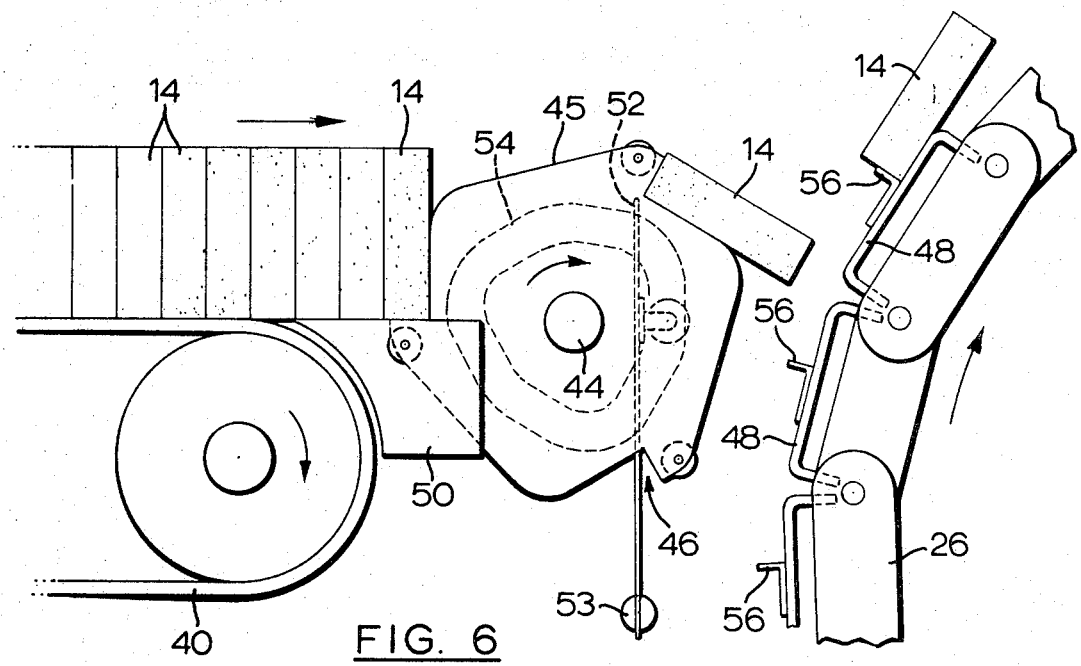
FIG. 6 is an elevational view of part of the FIG. 3 apparatus.

FIG. 6 shows the cams 45 to a larger scale. All of the cams 45 are identical, and each has three rectangular indentations 46 which permit it to pick up one of the facing elements 14, and carry it around for emplacement on the segmented main conveyor 26. The conveyor 26 itself consists of two chain-like portions along either edge, between which extend a plurality of inverted flat-bottomed channels 48 which contact each other when the conveyor is straightened out, forming a relatively non-porous surface. A plurality of stationary bridge cams 50 are shown in FIGS. 3, 4 and 6, and these bridge between the surface of the feed conveyor 40 and the cams 45. As shown in FIG. 6, a spring activated placing finger 52, pivoted at 53 is operated by a cam follower track 54 on each cam 45 to ensure that each brick facing element 14 is flipped on to the conveyor 26 immediately ahead of the locating pins 56 which are fastened to the channels 48. The emplacement of the brick facing elements 14 takes place as the conveyor 26 moves around the tail sprocket 58.

As the conveyor 26 comes around the tail sprocket 58, a set of detectors 60 ensure that each cavity on the conveyor 26 is filled with a brick facing element 14. The detectors 60 can be set to slow or stop the belt upon detection of a blank cavity, and also to operate an alarm signal. Electronic or air-operated detectors for this purpose will be familiar to those versed in this field, and no detailed description thereof is considered necessary in this specification.

Suspended above the conveyor 26 near the left hand end are one or two roll brushes 62 which contact the brick elements and ensure that they are in proper location. These brick-locating roll brushes 62 are preferably set at about 45° to the path of travel of the conveyor 26 so that rotation of the brushes with their bristles contacting the upper surfaces of the facing elements 14 brushes the elements against the same corner of the cavities established by the locating pins, so as to ensure uniform spacing in both planes between adjacent brick facing elements 14.

Two roller brushes 32 of adjustable height are adapted to spread the sand into all the spaces between the facing elements 14 flush with or slightly below the backs of the brick facing elements, and at the same time to clear all sand from the upper surfaces of the facing elements 14. As can be seen, the roller brushes 32 are angled slightly from a lateral direction with respect to the conveyor 26. The excess sand is swept into a collection hopper (not shown) at the side of the conveyor 26.

Located along each side of the conveyor 26 for the entire length of the conveyor 26 are regularly spaced closure blocks 64. The closure blocks 64 (shaded in FIG. 3) are spaced so as to be opposite alternate rows of brick. The closure blocks 64 are adapted to reciprocate laterally between an inward position in which they occupy the end "half-brick" space along the edge of the panels being formed, and an "outer" position in which they are clear of the outermost face of the projecting bricks in any panel. FIG. 3 shows the closure blocks 64 in outer, intermediate and inner positions. Each closure block 64 has a rightward extension 65 at its outer edge, which closes the space between adjacent closure blocks 64, and each closure block 64 and its extension have a vertical dimension equal to the desired thickness of the finished panel as measured from the face of the facing elements to the back of the urethane. The closure blocks 64 slide along extensions (not shown) on the conveyor 26 by means of a dovetail track. Each closure block 64 has a cam follower (not shown) which rides on a separate track (not shown) fastened to the frame 66 and supporting the conveyor 26. As the cam followers come in contact with this track, it pushes the closure blocks 64 into place immediately after the sand or other granular material has been distributed and brushed by the rollers 32. The end closure blocks and their extensions 65 form the sides of the continuous mold and also the profile of the end of the finished panel product. The same cam track retracts the end closure blocks 64 from their mold position after the urethane has cured.

The sand feeder mechanism 30 shown in FIG. 4 can be of any conventional construction. It is adapted to distribute sand or other granular material evenly and at a controllable rate over the surface of the face-down elements 14.

The conveyor 26 then passes beneath a row of conventional two-component urethane guns 70. The urethane guns 70 can be adapted either to traverse across the panel 26 or to remain stationary, depending on the requirements for the manufacture of the product. The guns 70 are connected to conventional storage, pumping and metering devices which ensure a constant accurate flow of the components for the polyurethane foam.

When it is desired to produce the embodiment shown in FIG. 2A, having a backing sheet 15, a dispensing rack is provided to hold the pre-cut sheets and to dispense them one at a time so that they are placed in proper relation to the brick facing elements 14. Once the backing sheets have been properly placed, the conveyor 26 passes beneath a companion belt 72, which exerts downward pressure to hold the whole assembly together during curing. The companion belt 72 is provided with separating bars 73 at intervals corresponding to the desired panel width, and are adapted to come down into the inter-panel spaces 73a as seen in FIG. 3. The ejection of backing sheets can be timed so that the separating bars 73 on the companion belt 72 engage and hold the backing sheets in proper location. Impaling sabres (not shown) on the companion belt could be used in addition to the separating bars 73 to hold backing sheets in place.

One way to produce the embodiment shown in FIG. 2B is to omit the backing sheets and their associated emplacement apparatus and have the companion belt 72 come down in direct contact with the polyurethane. The belt 72 will be in contact with the side closure blocks 64 and will form the top of the continuous mold. The companion belt 72 can be adjusted vertically to suit the thickness of the side closure blocks 64 and is adapted to move at the same linear speed as the primary conveyor 26. While the polyurethane is enclosed between the conveyor 26 and the companion belt 72, the curing and blowing takes place, and the resultant foam completely fills the continuous mold. A curing oven 36 may also be included, if desired, in order to reduce the curing time. The conveyor 26 and the companion belt 72 are of sufficient length that the panels are completely cured and rigid when they emerge from beneath the companion belt 72.

Another way to produce the embodiment shown in FIG. 2B is to raise the belt 72 so that the polyurethane foam core is double the desired thickness, and then bond to the upper surface of the polyurethane a layer such as prefinished plywood, roll roofing or plaster board in order to form an opposing skin to the brick surface. The panels can then be sliced centrally between the two faces to provide two building panels, each having a polyurethane face. By this procedure, any tendency for the panel to bend or warp while curing is counteracted.

This emergence from beneath the companion belt 72 takes place near the discharge end of the conveyor 26, as best shown in FIG. 4, and as the companion belt 72 swings around its end sprocket 74, a cleaner brush 76 cleans off any particles adhering to the belt 72 into a collection hopper 78, beneath which a flash take-away conveyor 79 is mounted to carry particles off to the side of the conveyor 26. The cleaner brush 76 can be swingably mounted to swing outwardly away from the companion belt 72 in order to let the separating bars 73 pass. It is also preferable at this point to spray a wax or similar release agent on the belt as from a gun 80, in order to reduce any tendency for the panels to stick to the companion belt 72.

The completed panels are propelled by means of the locating pins 56 onto a take-away conveyor 82 where any loose sand is removed by a high speed air jet from an air gun 84. The manufacturing belt is also cleaned with a belt brush 85 as it returns. The completed panels are removed by the conveyor 82 to an area where they are inspected, repaired if necessary, trimmed, and packaged for shipment.

It will be appreciated that other means, such as air-blowing means, could be substituted for the rollers 32, and that different methods for assuring that the facing elements are pushed into the desired position on the conveyor 26 could be substituted for the rollers 62.

Weathering tests conducted on building panels of this invention have given very satisfactory results. Prolonged exposure to sun, rain, and extremes in temperature (including freezing) have not produced any weakening in the bond between the polyurethane foam and the brick facing elements and sand joints. Minor problems have been encountered in relation to discolouration of the foam due to some agents incorporated into the foam. However, these problems can be eliminated by using other agents. Building panels constructed in accordance with this invention have been subjected to prolonged soaking in water with no loss in bond strength and less than 0.2% weight increase due to absorption. Rapid changes in temperature produced by freezing panels to −10° F. and then plunging them into water at 120° F. have had no adverse effect.

Building panels of this invention provide a number of advantages over conventional building panels. They possess excellent insulating characteristics, and give both an attractive appearance and a weather-proof outside covering without the necessity of further finishing. The polyurethane foam reduces or eliminates the necessity for further insulation and is also much lighter in weight than a conventional brick or stone wall of the same dimensions, thus providing several other economies in the construction of the building utilizing these panels. The foundation can be engineered and prepared to support a lesser building weight, and wall areas above a door or window often do not require additional support. The thickness of the exterior walls is reduced giving added interior space, and the actual construction of the wall places the insulation outside the frame members, thus reducing frame member expansion and contraction.

The panels normally are prefabricated and then transported to the construction site. The reduced weight of the panels permits easier storage and handling, and the cost of transportation also is lower than for conventional building materials.

The polyurethane foam is virtually non-absorbant and provides a high degree of waterproofing, which, on exterior application, eliminates the necessity for further waterproofing procedures. As well, it has good sound-proofing characteristics.

The building panel of this invention also can be utilized on an interior wall for decorative purposes, since its light weight does not require an extensive foundation or other structural support. The thickness of the polyurethane foam can be adjusted to any required dimension.

The insulating, waterproofing, sound absorbing and decorative features of the panel make it particularly suitable for the interior cladding of basement walls. When interior basement walls have an irregular surface, it is often of advantage to use the embodiment shown in FIG. 2B.

Further advantages relate to the vapour barrier properties of the panel, and these will be self-evident to those familiar with the building trade. Because the inter-stud space is clear of insulation, there is provided more space for duct, pipe and electrical installations.

While preferred embodiments of this invention have been disclosed herein, those skilled in the art will appreciate that changes and modifications may be made therein without departing from the spirit and scope of this invention as defined in the appended claims.

What I claim as my invention is:

1. A method of fabricating a rigid building panel which has a layer of cellular polyurethane, to one face of which are bonded a plurality of spaced facing elements, said method comprising the steps:
   positioning the facing elements in a desired spaced relationship outside-face-down on a flat surface,
   distributing in the spaces between said spaced facing elements a dry granular material chosen from the group consisting of (a) sand, (b) ground stone, (c) minerals, (d) ceramics, (e) pulverized brick, (f) pulverized glass,
   applying a layer of polyurethane in the liquid state over said facing elements and said granular material,
   and blowing and curing said polyurethane to produce a rigid polyurethane support suitable for said facing elements, said support being of cellular structure and containing discrete regions located in the spaces between said facing elements where the cellular structure has been collapsed by the presence of the said granular material to form a hard, dense and penetration-resistant layer.

2. A method as claimed in claim 1, in which the facing elements are uniform and resemble conventional bricks, whereby to give to the panel the appearance of a conventional brick wall with mortar between adjacent bricks.

3. A method as claimed in claim 1, in which the step of applying is immediately followed by the further step of affixing to the upper surface of the still liquid polyurethane a rigid backing sheet.

4. A method as claimed in claim 3, in which the rigid backing sheet is plywood.

5. A method as claimed in claim 3, in which the facing elements are uniform and resemble conventional bricks, whereby to give to the panel the appearance of a conventional brick wall with mortar between adjacent bricks.

6. A method as claimed in claim 5, in which the rigid backing sheet is plywood.

7. A method as claimed in claim 1, in which the step of applying is immediately followed by the further step of affixing rigid sheet material to the upper surface of the still liquid polyurethane, and in which the step of blowing and curing said polyurethane is followed by the further step of slicing the polyurethane layer intermediate the panel faces to produce two panels each having an exposed polyurethane face.

References Cited
UNITED STATES PATENTS

| | | | |
|---|---|---|---|
| 1,856,906 | 4/1932 | Carvel | 264—256 |
| 3,131,514 | 4/1964 | Siek | 52—309 |
| 3,187,068 | 6/1965 | De Vries et al. | 264—261 |
| 3,332,187 | 6/1967 | Arcarl | 52—309 |
| 3,378,617 | 4/1968 | Elmendorf | 264—261 |

DONALD J. ARNOLD, Primary Examiner

U.S. Cl. X.R.
264—157, 261